United States Patent Office 3,386,103
Patented June 4, 1968

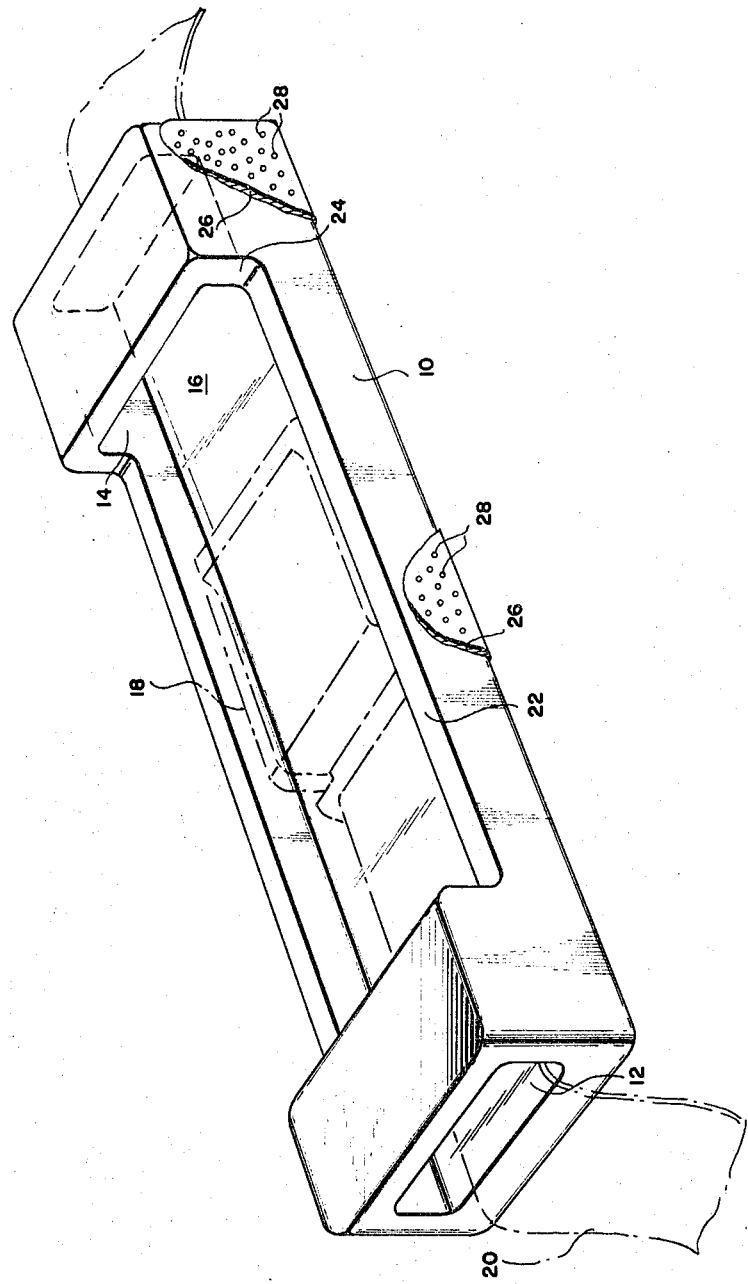

3,386,103
SEAT BELT PAD
Chris B. Robinson, P.O. Box 85007,
Hollywood, Calif. 90072
Filed Sept. 22, 1967, Ser. No. 675,734
3 Claims. (Cl. 2—2)

ABSTRACT OF THE DISCLOSURE

The present invention relates generally to a pad for cushioning the impact of vehicular seat belts against occupants during accidents. More particularly, the present invention is characterized by its simplicity in construction, low cost of manufacture and ease of use.

Background of the invention

Numerous previous inventors, such Ogburn 2,245,293, Muller 2,908,324, Johnson 3,013,555, and Graham 3,129,017, have considered the problems of "cushioning" belts used to restrict the movement of persons in varying environments. For the most part, however, existing cushions, particularly those designed for use with vehicular seat belts, are cumbersome, expensive and generally a nuisance to the user. In none of the known art is an effort made to cushion the user against bruising impact of the seat belt and buckle thereof, per se. With respect to shoulder strap pads Dopyera 3,050,734, and hand grips Abdella 2,301,843, substantially all encompassing protection is lacking for the reason that dissimilar objections are sought thereby. The present invention serves to minimize the shock and impact of automobile seat belts on occupants during accidents with the use of a cushion characterized by its simplicity in instruction, low cost of manufacture and ease of use.

Further, it serves to limit serious injury to occupants of cars during accidents with the use of an open-ended padding adapted to confine seat belts and fastening in cushioning contact with the body of the user.

Still a further object of the present invention is to provide a seat belt pad permitting easy access to the buckle thereof while cushioning the impact of belt against the body of occupant during accidents.

Still further objects of the present invention will become apparent from the ensuing specification and attached drawing in which the single figure is a perspective view of the open-ended padding enclosing a vehicular seat belt in cushioning relationship.

Description of the preferred embodiment

As illustrated, the present invention consists of a padding, generally designated by the reference numeral 10, which is provided with openings 12 and 14 at each end thereof enabling movement relative to belt 20. Also a suitable cut out portion 16, providing access to buckle 18 of seat belt 20, is defined within padding 10 by horizontal shoulders 22 and vertical shoulders 24, respectively.

Padding 10 is covered with material 26 such as cloth fabric, plastic, leather or leatherette, for example. Additionally, openings 28 may be provided to permit breathing for purposes of comfort.

By now, the operation of the present seat belt pad 10 is obvious. During accidents, padding 10 prevents serious injury or death frequently caused by "uncushioned" seat belts cutting internal organs of the body, as the occupant is thrown abruptly. Thus, the present invention prevents serious injury, frequently caused by the abrupt contact of "uncushioned" sharp seat belts and buckles. As is well known, the occupants of cars frequently fail to tighten seat belts sufficiently, which during an accident may cause even greater injury as the body is thrown some distance against the seat belt and metal buckle. However, with the present invention, a carefully prepared cushion softens impact while permitting easy access to the buckle for fastening and removing the belt assembly. Of course, at the heart of the present invention is the simplicity in design and construction of pad 10 permitting low selling cost while eliminating the nuisance of using more cumbersome constructions. Furthermore, for those people with claustrophobia who resist wearing "tight" seat belts, the present invention fills the air space between stomach of occupant and seat belt.

Manifestly, variation in design and construction of the present invention may be envisioned without departing from the spirit and scope of invention, as defined by the sub-joined claims.

I claim:
1. A padding assembly for confining a seat belt and buckle, comprising an elongated hollow body of cushioning material, said body being provided with open ends for insuring passage of said seat belt therethrough and opposed longitudinal shoulder vertical portions connecting the end portions of said body as well as confining the belt laterally, the mid-portion of said body being provided with a cut-out portion permitting access to the buckle of the belt for fastening and removal.

2. A padding as in claim 1, including a cover substantially encompassing the ends and shoulders of said body.

3. A padding as in claim 2, in which the covering is foraminous, permitting air circulation to the user.

References Cited

UNITED STATES PATENTS 2,245,293   6/1941   Ogburn _____ 128—134
2,301,843  11/1942   Abdella _____ 2—20

RICHARD J. SCANLAN, Jr., *Primary Examiner.*